(12) United States Patent
Beadle

(10) Patent No.: US 8,688,062 B2
(45) Date of Patent: Apr. 1, 2014

(54) WIRELESS COMMUNICATIONS SYSTEM WITH INTERFERENCE MITIGATION AND ASSOCIATED METHODS

(75) Inventor: Edward Beadle, Melbourne, FL (US)

(73) Assignee: Harris Corporation, Melbourne, FL (US)

( * ) Notice: Subject to any disclaimer, the term of this patent is extended or adjusted under 35 U.S.C. 154(b) by 234 days.

(21) Appl. No.: 13/442,044

(22) Filed: Apr. 9, 2012

(65) Prior Publication Data

US 2013/0267265 A1    Oct. 10, 2013

(51) Int. Cl.
*H04B 1/18* (2006.01)

(52) U.S. Cl.
USPC ....... 455/166.1; 455/63.1; 455/464; 455/450; 370/330

(58) Field of Classification Search
USPC ............. 455/166.1, 63.1, 464, 450, 455, 509, 455/516, 296, 114.2, 154.1, 166.2; 370/330, 329
See application file for complete search history.

(56) References Cited

U.S. PATENT DOCUMENTS

| | | | | |
|---|---|---|---|---|
| 4,077,046 A | * | 2/1978 | Morio | 386/203 |
| 5,991,311 A | * | 11/1999 | Long et al. | 370/524 |
| 7,205,859 B2 | | 4/2007 | Beadle et al. | 332/100 |
| 7,599,426 B2 | * | 10/2009 | Despain | 375/152 |
| 7,756,196 B1 | * | 7/2010 | Despain et al. | 375/152 |
| 7,956,807 B1 | | 6/2011 | Celebi et al. | 324/450 |
| 8,023,898 B2 | | 9/2011 | Abedi | 455/63.1 |
| 8,041,380 B2 | | 10/2011 | Hamdi et al. | 155/522 |
| 8,077,692 B2 | * | 12/2011 | Khandekar et al. | 370/344 |
| 8,135,088 B2 | * | 3/2012 | Palanki et al. | 375/295 |
| 8,208,438 B2 | * | 6/2012 | Han et al. | 370/330 |
| 2006/0013292 A1 | * | 1/2006 | Despain | 375/152 |
| 2009/0097447 A1 | * | 4/2009 | Han et al. | 370/330 |
| 2010/0166102 A1 | * | 7/2010 | Seyedi-Esfahani | 375/295 |
| 2012/0263143 A1 | * | 10/2012 | Han et al. | 370/330 |

\* cited by examiner

*Primary Examiner* — Minh D Dao

(74) *Attorney, Agent, or Firm* — Allen, Dyer, Doppelt, Milbrath & Gilchrist PA

(57) ABSTRACT

A communications system includes spaced apart sensing nodes each configured to receive signals within occupied portions of a frequency spectrum, and a coordinator node configured to communicate with the spaced apart sensing nodes. The coordinator node determines the occupied portions of the frequency spectrum, and determines unoccupied portions of the frequency spectrum based upon the occupied portions. A pair of wireless communications devices is configured to communicate with each other and with the coordinator node. The pair of wireless communications devices may operate within an unoccupied portion of the frequency spectrum based on using a communications signal comprising a continuous phase modulated waveform, with at least one waveform parameter being selected to reduce interference with the occupied portions of the frequency spectrum.

34 Claims, 12 Drawing Sheets

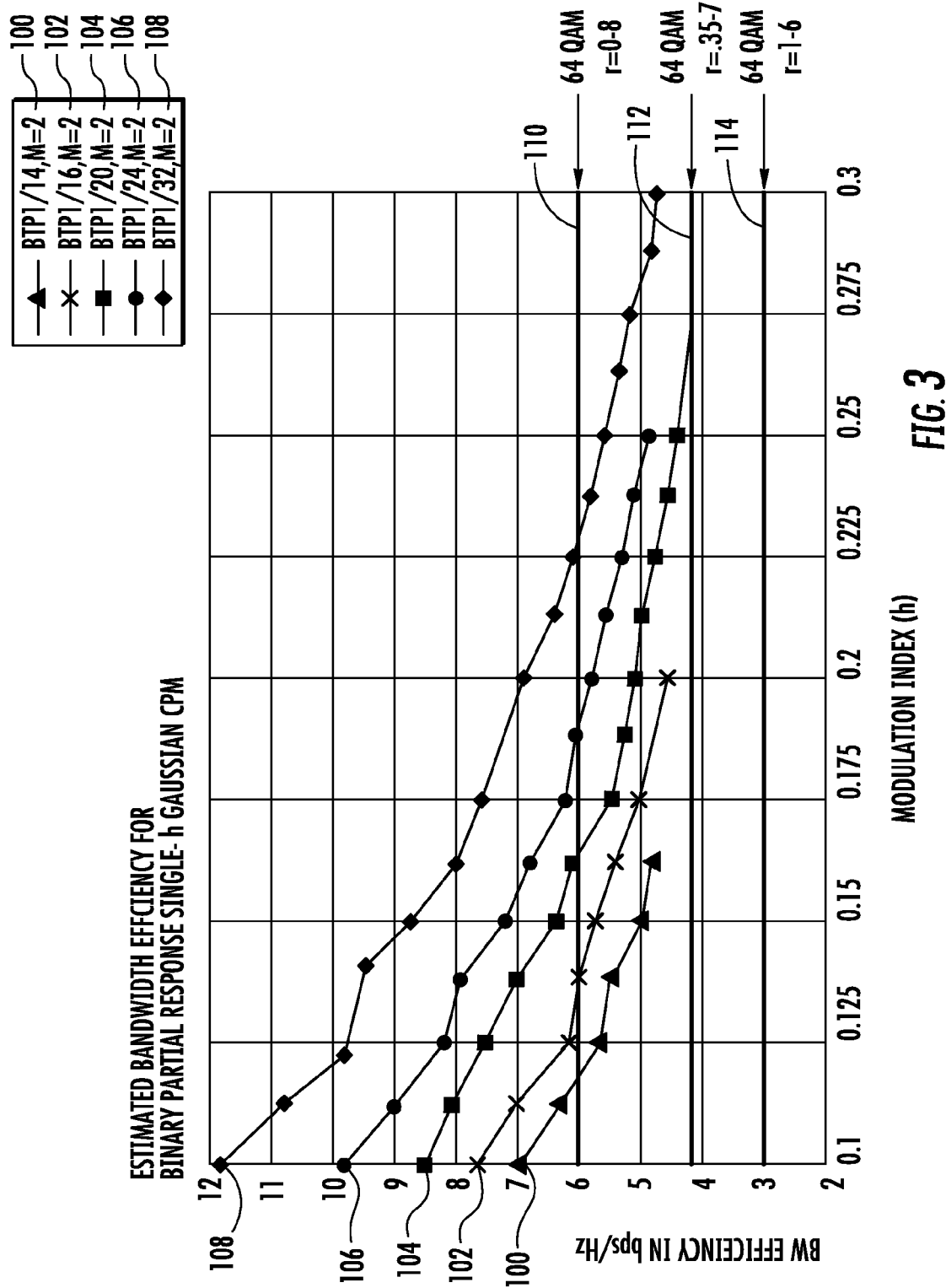

LRC $g(t) = \begin{cases} \frac{1}{2LT}\left[1 - \cos\left(\frac{2\pi t}{LT}\right)\right], & 0 < t < LT \\ 0 & \text{OTHERWISE} \end{cases}$ TFM $g(t) = \frac{1}{8}[g_0(t-T) + 2g_0(t) + g_0(t+T)]$ $g_0(t) = \frac{1}{T}\left[\frac{\sin\left(\frac{\pi t}{T}\right)}{\frac{\pi t}{T}} - \frac{\pi}{24}\frac{2\sin\left(\frac{\pi t}{T}\right) - \frac{2\pi t}{T}\cos\left(\frac{\pi t}{T}\right) - \left(\frac{\pi t}{T}\right)^2 \sin\left(\frac{\pi t}{T}\right)}{\left(\frac{\pi t}{T}\right)^3}\right]$ LSRC $g(t) = \frac{1}{LT} \cdot \frac{\sin\left(\frac{2\pi t}{LT}\right)\cos\left(\beta\frac{2\pi t}{LT}\right)}{\frac{2\pi t}{LT} - T - \left(\frac{4\beta}{LT}t\right)^2}$ $\quad 0 < \beta < 1$ GMSK $g(t) = \frac{1}{2T}\left\{Q\left[2\pi B_b \frac{t - \frac{T}{2}}{(\ln 2)^{1/2}}\right] - Q\left[2\pi B_b \frac{t + \frac{T}{2}}{(\ln 2)^{1/2}}\right]\right\}$ $Q(t) = \int_t^\infty \frac{1}{(2\pi)^{1/2}} e^{-r^2/2} \, dr$ LREC $g(t) = \begin{cases} \frac{1}{2LT} & 0 < t < LT \\ 0 & \text{OTHERWISE} \end{cases}$

FIG. 12

US 8,688,062 B2

WIRELESS COMMUNICATIONS SYSTEM WITH INTERFERENCE MITIGATION AND ASSOCIATED METHODS

FIELD OF THE INVENTION

The present invention relates to the field of wireless communications, and more particularly, to wireless communications devices operating in a shared frequency spectrum with reduced interference.

BACKGROUND OF THE INVENTION

In wireless communications systems, communications devices generally communicate with one another using radio transmissions that share the same transmission medium. Although such radio transmissions are normally configured to occupy allocated or assigned frequency bands, the radio-frequency spectrum is nevertheless shared by such transmissions.

Radio transmissions occupying the same parts of the shared communications spectrum can interfere with one another. The level of interference will depend on a number of factors, such as power levels of the respective transmissions and on the relative locations of the transmitters. In fact, many factors have an impact on interference.

Cognitive radios, for example, are configured to change its transmission or reception parameters to communicate efficiently without interfering with licensed users. This alteration of parameters is based on actively monitoring several factors in the external and internal radio environment, such as radio frequency spectrum, user behavior and network state.

In wireless communications systems operating with cognitive radios, the unlicensed (secondary) users can use the licensed spectrum as long as the licensed (primary) user is absent at some particular time slot and some specific geographic location. However, when the primary user reappears, ideally, the secondary users should vacate the spectrum instantly to avoid interference with the primary user.

The explosive growth in wireless services over the past several years illustrates the huge and growing demand of the business community, consumers and the government for wireless communications. With this growth of communication applications, the spectrum has become even more congested. Even though the Federal Communications Commission (FCC) has expanded some spectral bands, these frequency bands are exclusively assigned to specific users or service providers. Such expansion does not necessarily mean that the bands are being efficiently all the time.

In this regard, it has been shown that a large part of the radio frequency spectrum is vastly under-utilized. For example, cellular network bands are overloaded in most parts of the world, but amateur radio or paging frequencies are not. Moreover, those rarely used frequency bands are assigned to specific services that cannot be accessed by unlicensed users, even where transmissions of the unlicensed users will not introduce any interference to the licensed service.

To deal with the conflicts between spectrum congestion and spectrum under-utilization, cognitive radios allow secondary users to utilize licensed bands opportunistically. By detecting particular spectrum "holes" and jumping into them rapidly to meet demand for spectrum, cognitive radios can improve the spectrum utilization significantly.

To insure high spectrum efficiency while avoiding interference to licensed users, cognitive radios should be able to adapt to spectrum conditions flexibly. One approach is disclosed in U.S. Pat. No. 8,041,380 where the transmit power of a cognitive radio is controlled so that the cognitive, unlicensed radio device does not interfere with the use of a shared spectrum by a primary, licensed device. Controlling the transmit power includes determining a distance, or a function of the distance, between a primary transmitter of the primary device and the cognitive radio device based on sensing information from a spectrum sensing process. The maximum transmit power of the cognitive radio device is then dynamically controlled based on the distance, or the function of the distance, while considering a worst case scenario of an underlying cognitive radio model, to provide a quality of service requirement of the primary device.

In addition, spectrum allocation within of a cluster of communications devices is a relatively small-scale and localized process, but it can be viewed as part of a hierarchy of spectrum allocation procedures with higher-level allocation being performed at a network level and even at an inter-network level.

This is particularly the case when a number of wireless networks co-exist and they operate at the same time in adjacent or overlapping geographical areas. One approach to improve the abilities of multiple networks to co-exist and coordinate themselves is disclosed in U.S. Pat. No. 8,023,898. An interference mitigation method in a wireless communications network is provided in which a plurality of nodes share an available frequency spectrum by performing wireless communications on sub-channels defined within the available spectrum. The nodes are grouped into clusters, each cluster having a leader of the cluster. Preferably, every node in the cluster is a transceiver equipped to act as leader and this leader role is rotated around the cluster.

Even in view of the advances made for interference mitigation in wireless communications networks and systems, there is still a need to improve how multiple communications devices can operate within a shared spectrum allocation without interfering with one another.

SUMMARY OF THE INVENTION

In view of the foregoing background, it is therefore an object of the present invention to provide a wireless communications system that allows wireless communications devices to adapt to prevailing spectrum conditions for end-end transmissions without interfering with other wireless communications devices.

This and other objects, features, and advantages in accordance with the present invention are provided by a communications system comprising a plurality of spaced apart sensing nodes each configured to receive signals within occupied portions of a frequency spectrum, and a coordinator node configured to communicate with the plurality of spaced apart sensing nodes. The coordinator node determines the occupied portions of the frequency spectrum, and determine unoccupied portions of the frequency spectrum based upon the occupied portions. The communications system also comprises a pair of wireless communications devices configured to communicate with each other and with the coordinator node. Each pair of wireless communications devices operates within an unoccupied portion of the frequency spectrum based on using a communications signal comprising a continuous phase modulated (CPM) waveform, with at least one waveform parameter being selected to reduce interference with the occupied portions of the frequency spectrum.

The CPM waveform may be a partial response CPM waveform. Selection of the at least one waveform parameter may include the modulation index, which controls the spectral occupancy. A lower modulation index allows the bandwidth efficiency to increase. Selection of the at least one waveform parameter may also include the pulse shape and duration.

Selection of the frequency and waveform parameters advantageously allows wireless communications devices to adapt to prevailing spectrum conditions for end-end transmissions without interfering with other wireless communications devices. Another advantage is that the number of wireless communications devices can be increased in bandwidth limited channels by advantageously selecting the waveform parameters within the communications system.

Another aspect is directed to a method for operating a communications system as described above. The method comprises operating a plurality of spaced apart sensing nodes, with each sensing node being configured to receive signals within occupied portions of a frequency spectrum. A coordinator node operates to communicate with the plurality of spaced apart sensing nodes to determine the occupied portions of the frequency spectrum, and to determine unoccupied portions of the frequency spectrum based upon the occupied portions. The method further comprises operating at least one pair of wireless communications devices to communicate with each other and with the coordinator node, and operate within an unoccupied portion of the frequency spectrum based on using a communications signal comprising a continuous phase modulated waveform. The at least one waveform parameter is selected to reduce interference with the occupied portions of the frequency spectrum.

BRIEF DESCRIPTION OF THE DRAWINGS

FIG. 3 is a graph comparing spectral efficiency of binary Gaussian continuous phase modulated (CPM) waveforms with QAM schemes in accordance with the present invention.

FIG. 12 provides equations defining the respective waveforms illustrated in FIG. 11.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

Figure 1:
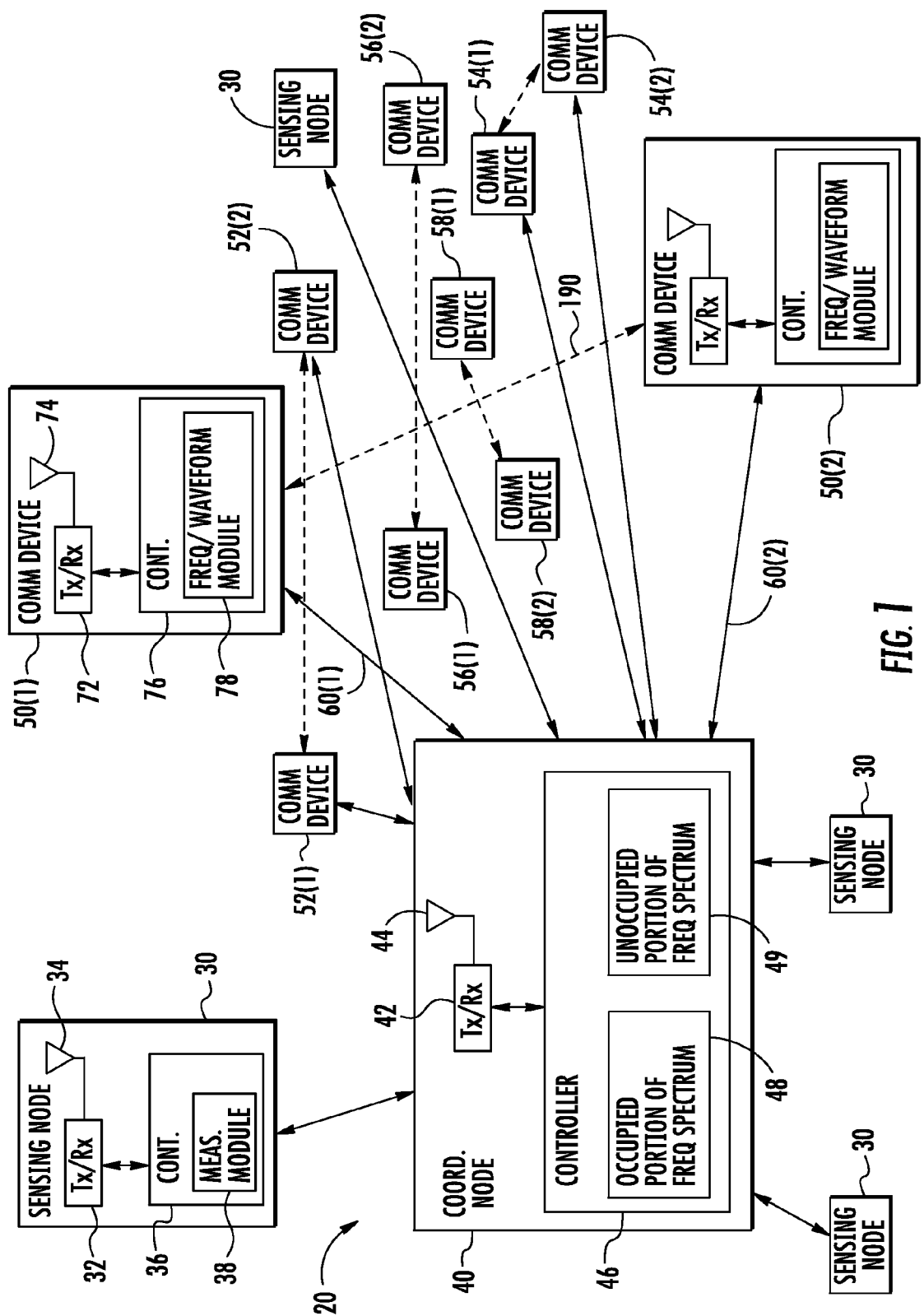
FIG. 1 is block diagram of a communications system in accordance with the present invention.
Figure 2A:
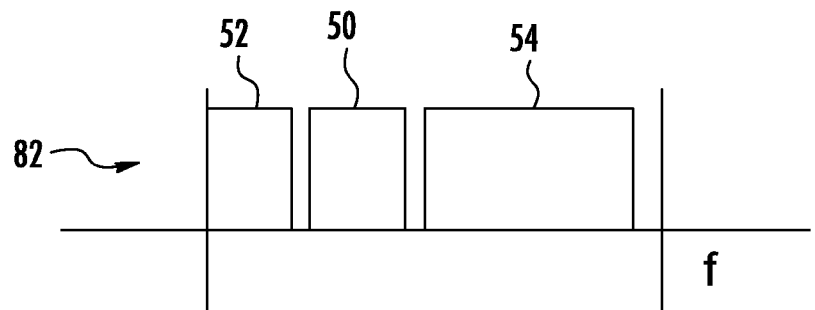
FIGS. 2A-2D are timelines illustrating frequency spectrum allocations for the communications devices illustrated in FIG. 1.
Figure 2B:
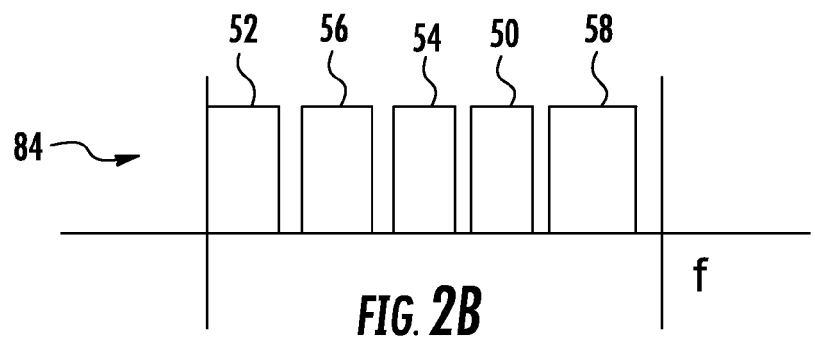
Figure 2C:
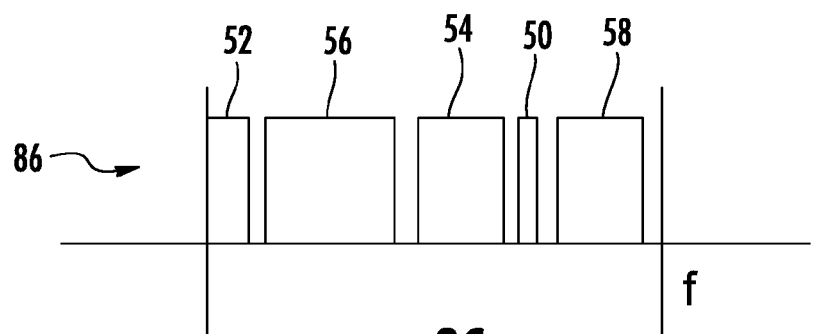
Figure 2D:
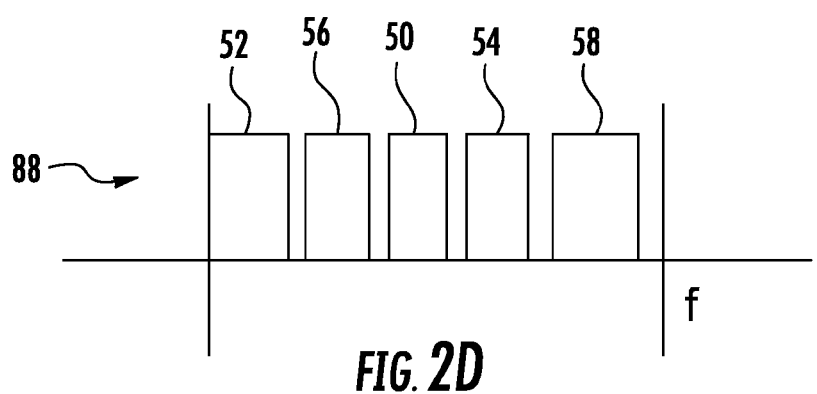

Referring initially to FIG. 1, a communications system 20 includes spaced apart sensing nodes 30 each configured to receive signals within occupied portions of a frequency spectrum, and a coordinator node 40 that communicates with the spaced apart sensing nodes. The coordinator node 40 determines the occupied portions of the frequency spectrum, and determines unoccupied portions of the frequency spectrum based upon the occupied portions.

The illustrated pairs of wireless communications devices 50(1)-50(2), 52(1)-52(2) and 54(1)-54(2) are configured to communicate with each other and with the coordinator node 40, and operate within an unoccupied portion of the frequency spectrum. For discussion purposes, attention will be focused on one of the pairs of wireless communications deices, such as wireless communications deices 50(1)-50(2), for example.

Operation of each pair of wireless communications devices 50(1)-50(1) is based on using a communications signal comprising a continuous phase modulated (CPM) waveform, with at least one waveform parameter being selected so that the wireless communications devices operate within an unoccupied portion of the frequency spectrum as determined by the coordinator node 40. As will be explained in greater detail below, waveform parameters are advantageously selected so that the communications devices 50(1)-50(2) operate within band-limited channels without sacrificing data rate and maintaining a constant peak-to-average signal power ratio (PA).

The sensing nodes 30 are spread out to cover a geographic area, and may be fixed or mobile. Each sensing node 30 includes a transceiver 32, an antenna 34 and a controller 36. The controller 26 includes a measurement module 28 to measure signals received by the transceiver 32 via the antenna 34. The transceiver 32 operates over a defined frequency spectrum that includes the operating frequencies of the various wireless communications devices. In other words, the sensing nodes 30 temporally determine the spatial and frequency occupancy of the electromagnetic spectrum across the geographic area. The transceiver 32 within each sensing node 30 transmits to the coordinator node 40 the occupied portions of the frequency spectrum as determined by the measurement module 38. Each occupied portion may be defined by a center frequency and bandwidth, for example.

In addition to the wireless communications devices 50(1)-50(2), 52(1)-52(1) and 54(1)-54(2) that operate within the defined frequency spectrum within the geographic area, other communications devices 56(1)-56(2) and 58(1)-58(2) may also operate within the same defined frequency spectrum within the geographic area yet not communicate with the coordinator node 40. Nonetheless, the sensing nodes 20 measure signals received from these other communications devices 56(1)-56(2) and 58(1)-58(2) as well, and transmit to the coordinator node 40 their corresponding occupied portions of the frequency spectrum. Again, each occupied portion may be defined by a center frequency and bandwidth, for example.

The coordinator node 40 determines the location of each sensing node 30. This may be based on predetermined information, or is communicated to the coordinator node 40 from the sensing nodes 30. Consequently, when each sensing node 30 transmits to the coordinator node 40 the occupied portions of the frequency spectrum as determined its measurement module 38, this is with respect to the geographic location of that sensing node. Updates on the occupied portions of the frequency spectrum are provided by each sensing node 30 to the controller 40. The coordinator node 40 also determines the location of each wireless communications device. This may be based on predetermined information, or is communicated to the coordinator node 40 from each wireless communications device.

The coordinator node 40 includes a transceiver 42 and an antenna 44 coupled thereto, and receives transmissions from the different sensing nodes 30 reporting the occupied portions of the frequency spectrum. The coordinator node 40 includes a controller 46 coupled to the transceiver 42 to collectively determine the occupied portions 48 of the frequency spectrum throughout the geographic area, and the unoccupied portions 49 of the frequency spectrum throughout the geographic area based on the occupied portions.

The coordinator node 40 advantageously determines the location of each wireless communications device 50(1)-50(2), 52(1)-52(2) and 54(1)-54(2) and the communications links established therebetween. The coordinator node 40 thus knows which communications device is talking to which communications device, and in effect, operates as a telephone operator.

Operation of the communications system 20 will now be discussed with respect to communications devices 50(1)-50(2). The following discussion is equally applicable to the other communications devices, as readily appreciated by those skilled in the art. Communications device 50(1) will be referred to as the first communications device, and communications device 50(2) will be referred to as the second communications device.

Bach communications device, such as 50(1), includes a transceiver 72, an antenna 74 coupled to the transceiver, and a controller 76 coupled to the transceiver. The controller 76 includes a frequency/waveform module 78 configured to perform frequency and waveform parameters selection.

Before communications takes place, the first communications device 50(1) provides a request to the coordinator node 40 over a control link 60(1) that it would like to communication with the second communications device 50(2). The request may also include a desired bandwidth. For example, if the first communications device 50(1) needs to transmit video as compared to text to the second communications device 50(2), then more bandwidth is needed if a fixed time for the transfer is imposed. If latency is not an issue less bandwidth may be allocated to that transmission.

The control link 60(1) is a low data rate link, and may use a waveform other than the CPM waveform used between the communications devices 50(1)-50(2). The waveform of the control link 60(1) may be phase shift keying, for example. The control link 60(1) is basically for synchronization and control of the communications devices 50(1)-50(2).

The coordinator node 40 responds to the request from the first communications device 50(1) by providing one or more frequency allocations that are available for use within the unoccupied portions of the frequency spectrum. Each frequency allocation includes a center frequency and bandwidth.

If more than one frequency allocation is available, then the frequency/waveform module 78 within the controller selects one of the frequency allocations. As noted above, if a certain bandwidth is required by the first communications device 50(1), then the frequency allocation having the appropriate bandwidth is selected.

In addition, the frequency/waveform module 78, as will be explained in greater detail below, also selects the waveform parameters for the CPM waveform to best support the information to be transmitted within the available bandwidth. As a non-limiting example of a centralized network control, the control node 40 may be equipped with knowledge on the capabilities of the individual communications devices (e.g., processing ability).

Part of the control algorithm in the communications controller is to directly program or set-up the remote wireless communication devices using the control links. In this case the communication controller exerts direct control over the remote devices to set the waveform parameters. An advantage of this scheme is that no latency is incurred to set up a data transmission. However, detailed knowledge is required by the controller device 40 about each communication device.

To reduce the complexity of the controller and enable a more cognitive network operation in more advanced scenarios, communication devices themselves may be allowed to negotiate communication waveform parameters as a distributed control scheme. In this case, the controller 76 within the communication device 50(1) becomes more complex.

Selectable CPM waveform parameters at the physical layer includes a modulation index, pulse shape and pulse duration. The control algorithms, whether centralized or distributed, are aware of the implications of different waveform parameter settings. A typical objective for a waveform where spectral occupancy is an issue is to maximize bandwidth efficiency for the reason of transmitting the maximum information throughput in the minimum possible bandwidth. This in turn can allow more users to share a specific segment of spectrum, and increase some measures of network utility. As an example, the bandwidth efficiency (BW) of CPM can be increased as the modulation index (h) decreases. Alternatively, if less bandwidth (BW) is needed, then the modulation index (h) can be increased.

The selection of the modulation indices has implications on the detailed design of the communication devices, and hence, there is likely to be a discrete set of application-specific preferred indices. It is also plausible to control the bandwidth efficiency thru the selection of the pulse shape and duration.

The frequency/waveform module 78 advantageously allows communications within an unoccupied portion of the frequency spectrum without sacrificing data rates and while maintaining a low PAR (peak to average ratio). A PAR greater than unity negatively impacts receiver dynamic range requirements.

As mentioned above, frequency and waveform parameters may be selected by the frequency/waveform module 78. Described herein is a non-limiting example of a centralized control of the communication devices. Those skilled in the art will appreciate how various control functions can be distributed to the nodes to reduce the complexity of the controller 40.

With a node desired to initiate communication to another node, the controller node 40 obtains the status of the nodes individual resources, capabilities, and state over the control link 60(1), 60(2). The coordinator will then select the appropriate waveform parameters and will provide this information to the communications devices 50(1)-50(2) over another control link 60(1), 60(2). In response to various network spectrum temporal usage patterns, the frequency and waveform parameters selected by the frequency/waveform module 78 will dynamically change over time as the occupied and unoccupied portions of the frequency spectrum change within the geographic area (see FIG. 2A-2D). The controller will provide updates to the communication nodes 50(1)-50(2) via the control link 60(1), 60(2).

In FIGS. 2A-2D, timelines illustrating frequency spectrum allocation for the various communications devices operating within the geographic area of the communications system 10 is provided. In each timeline section 82-88, the coordinator node 40 advantageously keeps track of which wireless communications devices are communicating, when they are communicating, and at what portions of the frequency spectrum.

In the first timeline section 82, the first and second communications devices 50(1)-50(2) are represented by spectrum allocation 50. Spectrum allocations 52 and 54 correspond to communications devices 52(1)-52(2) and 54(1)-54(2). In the next timeline section 84, spectrum allocations 56 and 58 corresponding to communications devices 56(1)-56(2) and 58(1)-58(2) are added. As a result, the available frequency allocation 50 for the first and second communications devices 50(1)-50(2) is decreased. In the next timeline section 86, communications devices 56(1)-56(1) are allocated a larger portion of the frequency spectrum. As a result, the available frequency allocation 50 for the first and second communications devices 50(1)-50(2) is decreased even more. However, in the next timeline section 88, the available frequency allocation 50 for the first and second communications devices 50(1)-50(2) is increased. This illustrates that the number of wireless communications devices can be increased in bandwidth limited channels by advantageously selecting the waveform parameters.

As illustrated above, the coordinator node 40 provides to the communications devices what specific frequency allocations are available. The communications devices thus use the coordinator node 40 to help make their connection with one another, which may be referred to a rendezvous. The communications devices each contact the coordinator node 40 for permission to communicate with one another. The coordinator node 40 knows the traffic level, priority, allowed latency, etc. within the geographic area so that the appropriate frequency allocation assignments can be made, as well as timing and synchronization, which in turn allows global utility of the communications links under its control to be efficiently utilized.

As an alternative to the centralized control described above, the coordinator node 40 still provides one or more available frequency allocations and bandwidths to the first and second communications devices 50(1)-50(2), and once an available frequency allocation has been selected and coordinated between the pair of wireless communications devices, but the wireless communications devices themselves operate directly (i.e., without going through the coordinator node 40) to allow a negotiated use of what capabilities each device has and what waveforms may be used. In other words, in this distributed control architecture, the receiver in the second wireless communications device 50(2) can inform the transmitter in the first wireless communications device 50(1) of its maximum conversion rate, and the transmitter will select pulse shape parameters (i.e., spectral support) allowing the receiver to reconstruct the waveform with an arbitrary number of samples per symbol. As mentioned above, a distributed control reduces the complexity of the central controller node 40, but increases complexity of the communication nodes 50(1)-50(2).

Dynamically adapting the waveform parameters to match the prevailing frequency spectrum conditions for end-to-end transmission will now be discussed in greater detail. Additional material is provided in U.S. Pat. No. 7,205,859 which is assigned to the current assignee of the present invention, and is incorporated herein by reference in its entirety.

Signal containment is dynamically altered based on using a multi-modulation index (multi-h) partial response CPM waveform instead of simply altering symbol constellation size (e.g., M). Communications devices dynamically self-adapt waveform parameters (e.g., modulation index, pulse shape and pulse duration) to service varied user "offered loads" (e.g., video, voice, text, etc.) to fit within a given frequency spectrum allocation.

Preferably, the waveform parameters are chosen to use a less complex waveform, if possible, while supporting the needed bandwidth within the allocated frequency spectrum. Another advantage is that constant envelope signals support multi-carrier transmissions when desirable. This allows a symbol stream to be fragmented to reduce latency, multiple user streams are supported, and symbol content may be randomly placed onto the carriers. A constant envelope signal also allows multiple waveforms to be stacked next to each other. In addition, data transmitted by the CPM waveform has low probability of intercept (LPI) characteristics. In addition, frequency/waveform parameter selection is compatible with software defined radio architectures.

Referring now to FIG. 3, the modulation index h has a direct relationship to the BW efficiency, whereas the BW efficiency of QAM formats is independent of h. Other linear modulations, such as PSK, will show similar independence of the modulation index h.

The bandwidth (SW) efficiency is in bps/Hz (bits per second per hertz). The CPM signals are represented by lines 100, 102, 104, 106 and 108. The waveform uses binary signaling M=2 as a non-limiting example. The bandwidth time product (BTP) corresponding to lines 100, 102, 104, 106 and 108 correspond to $1/14$, $1/16$, $1/20$, $1/24$ and $1/32$ respectively. The QAM signals are represented by flat lines 110, 112 and 114. For the 64-QAM signals, r=1, 0.35, and 0 respectively, where r is the roll-off factor characterizing the steepness of the filter roll-off.

A binary partial response Gaussian CPM waveform is thus provided, where binary signaling (i.e. M=2) and the pulse shape is Gaussian. Higher-order formats (i.e., later M) are not precluded. In addition, other pulse shapes are readily acceptable as well be later discussed in reference to FIG. 11. These pulse shapes include Raised Cosine (RC), Spectral Raised Cosine (SRC), Tamed Frequency Modulation (TFM) and Gaussian Minimum Shift Keying (GMSK).

The spectrally compact nature of a partial response CPM communication signal, particularly as used with a binary signaling (i.e. M=2), with a phase pulse derived from a Gaussian filter, and a small bandwidth-time (BT) enables ADCs, even with modest analog bandwidths and sample rates, to provide the necessary data samples for proper demodulation of very high data rate signals.

Figure 4:
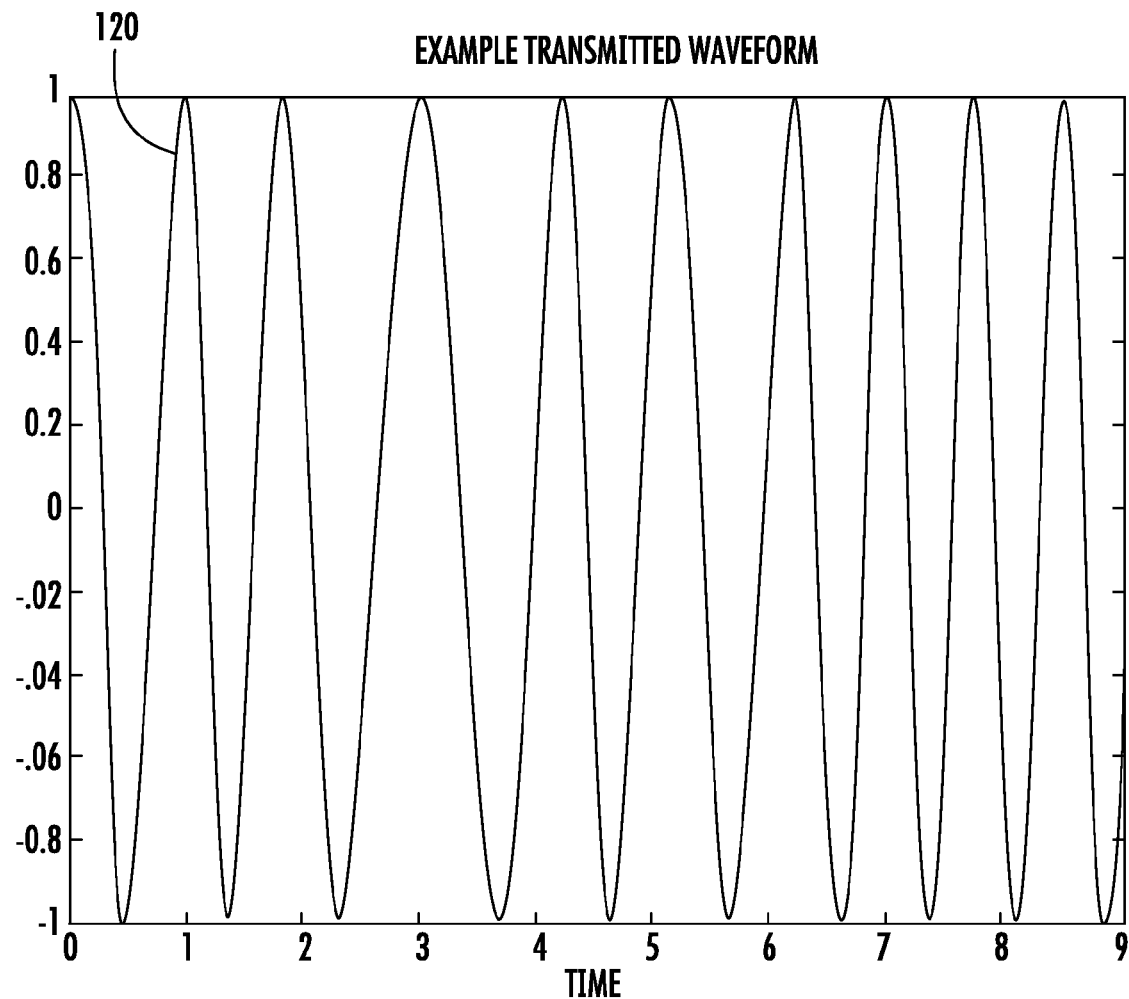
FIG. 4 is a graph representation of an example transmitted CPM waveform in accordance with the present invention.

For a specific M-ary CPM waveform, it advantageously has a constant envelope modulation, and using methods of partial response signaling it can be selected to attain arbitrarily high spectral efficiency at a fixed M. Hence, high data rate communications are thus possible without requiring increased ADC conversion speeds or higher-order modulation formats. Hence, the wireless communications devices 50(1)-50(2) may be used over band-limited channels with high data rates. An example transmitted CPM waveform is represented by reference 120 in FIG. 4.

A partial response CPM waveform is described below. The partial response CPM waveform is given by:

$$s(t) = \sqrt{\frac{2E_s}{T_s}} \cos(2\pi f_o t + \Phi(t, \alpha) + \phi_0)$$

where $\phi(t,\alpha)$ is a continuous function called the excess phase, and it is expressible as:

$$\Phi(t, \alpha) = 2\pi h \sum_{k=-\infty}^{\infty} \alpha_k q(t - kT_s)$$

where $$\alpha_k \in \pm 1, 3, \ldots, \pm(M-1)$$

$$q(t) = \int_{-\infty}^{t} g(\tau) d\tau$$

$$q'(t) = g(t)$$

The phase pulse shape is represented by q(t), and the spectral shape of the pulse width of the waveform is represented by q(t). These parameters along with the modulation index h are selected to control the expanse of the spectrum. The information symbols are represented by $\alpha_k$ are chosen from an M-ary alphabet, where usually M is a power of two. The symbol rate is represented by $T_s$. The excess phase is the information-bearing portion of the waveform.

Figure 5:
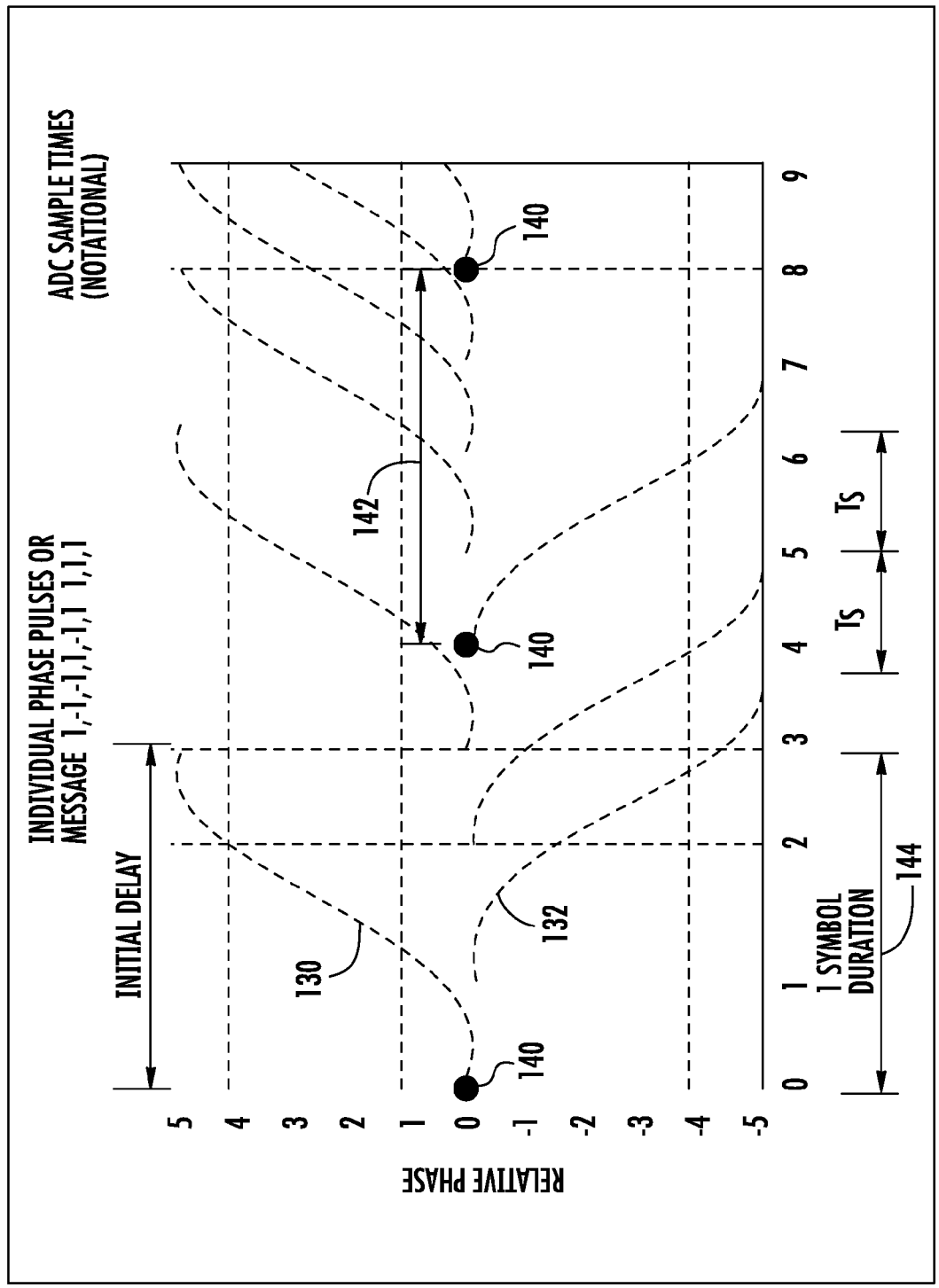
FIG. 5 is a graph representation of individual phase pulses corresponding to different message bits for a message in accordance with the present invention.

A sequence of phase pulses (normalized to 1 symbol per second) is shown in FIG. 5 for the information symbol sequence 1, −1, −1, 1, −1, 1, 1, 1, 1. The positive phase pulses 130 represent the information symbol "1", whereas the negative phase pulses 132 represent the information symbol "−1". The ADC sample times 140 are locations along the time axis shown in the particular embodiment with a sample time period 142 greater than the symbol duration 144.

Figure 7:
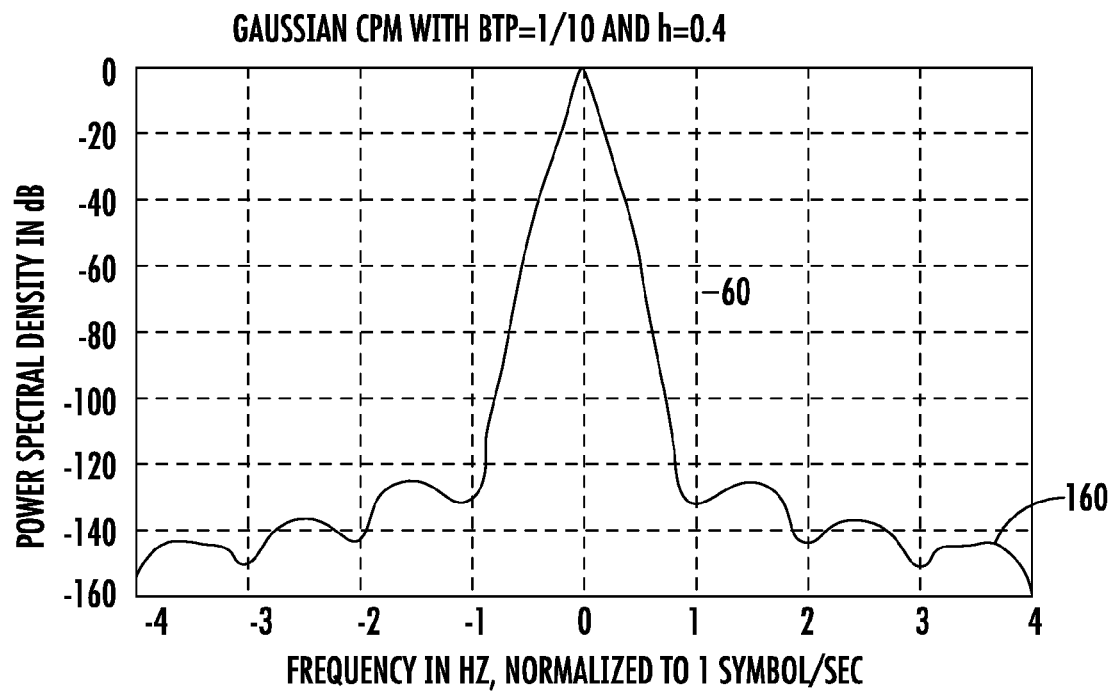
FIG. 7 is a graph representation of a power spectral density for a Gaussian CPM waveform with a BTP=0.1 and an h=0.4 in accordance with the present invention.
Figure 8:
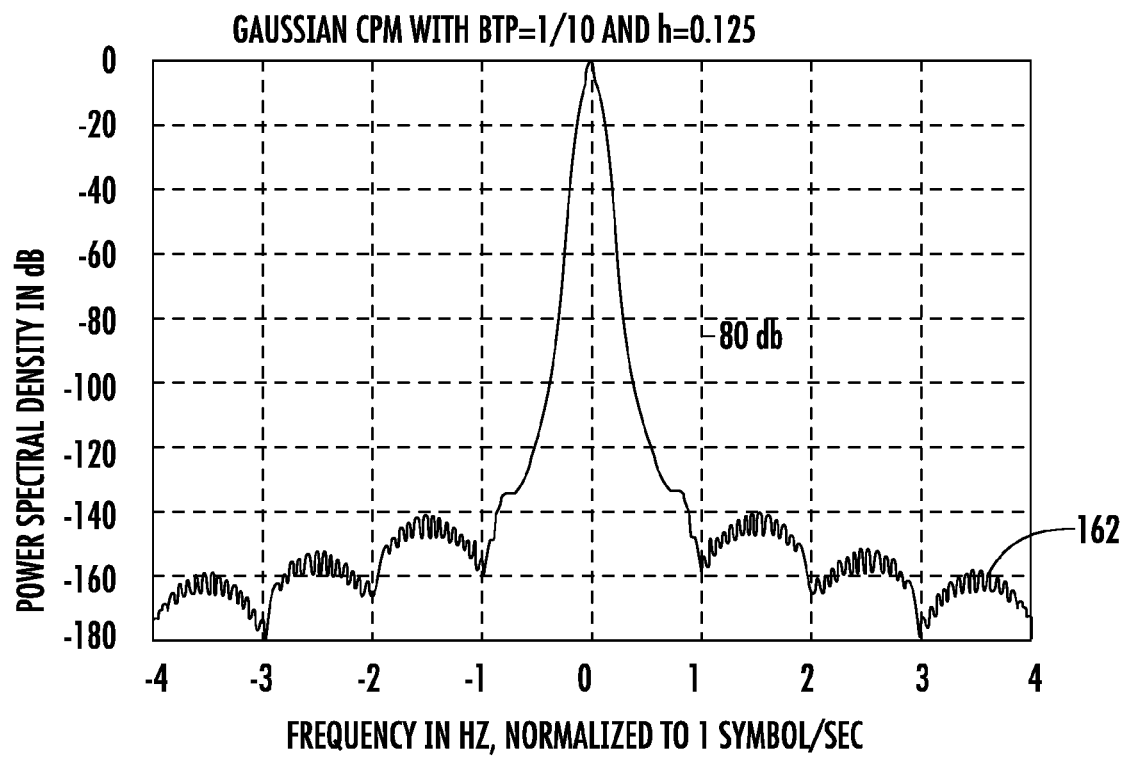
FIG. 8 is a graph representation of a power spectral density for a Gaussian CPM waveform with a BTP=0.1 and an h=0.125 in accordance with the present invention.
Figure 9:
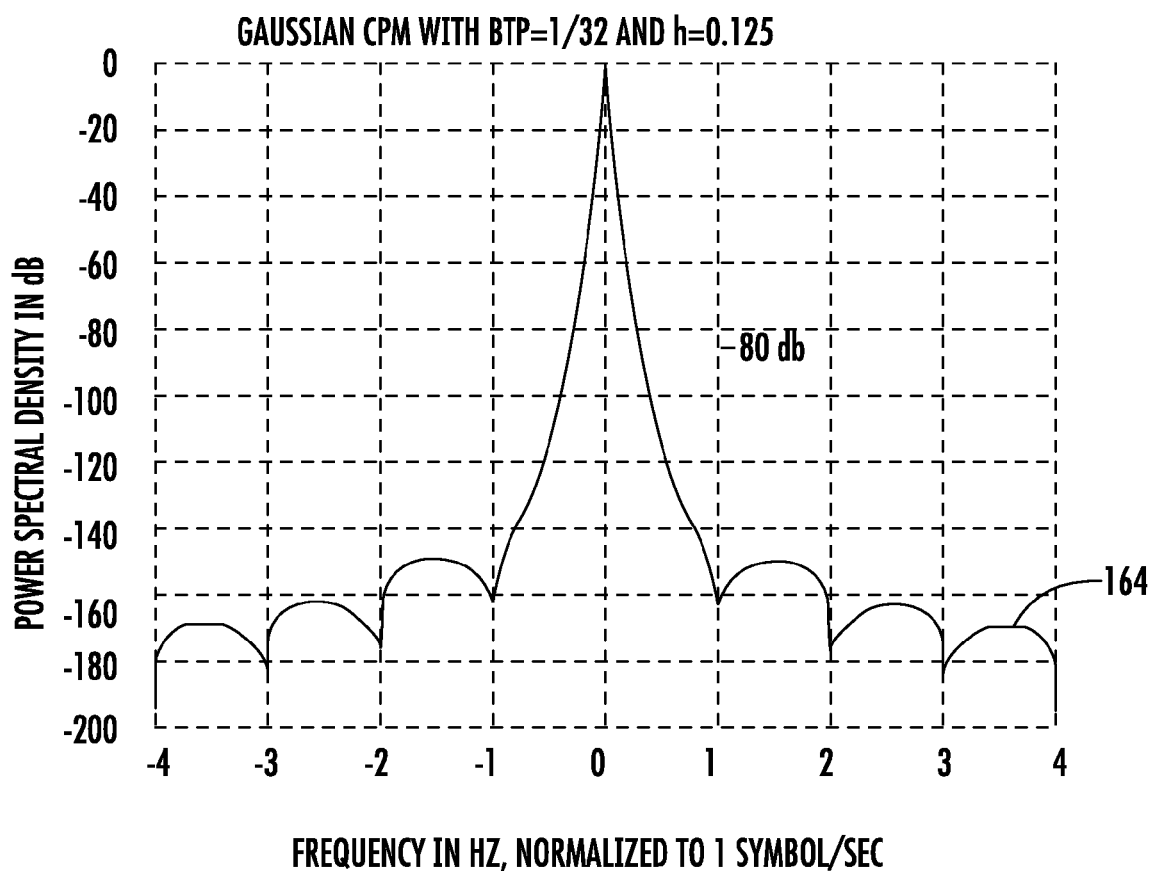
FIG. 9 is a graph representation of a power spectral density for a Gaussian CPM waveform with a BTP=0.03125 and an h=0.125 in accordance with the present invention.

Each symbol has not traversed its full range or symbol duration 144 before the next symbol enters the channel. This corresponds to intersymbol interference (ISI), which is usually detrimental in communications. The ISI occurs because each symbol duration, at least in this example, is 3 times longer than the symbol period, defined as the inverse of symbol rate or symbol frequency. However, this illustrative example is not limited to this relationship and other relationships are equally foreseen and not excluded herein. The symbols are intentionally lengthened, by reducing h and BTP to produce a more compact spectrum as shown in FIGS. 7, 8 and 9 which are discussed later in greater detail. A symbol support of 1/BTP symbols is used, where BTP is typically 10 or more. The aggregate excess phase signal for the information sequence from FIG. 5 is shown in FIG. 6.

Figure 6:
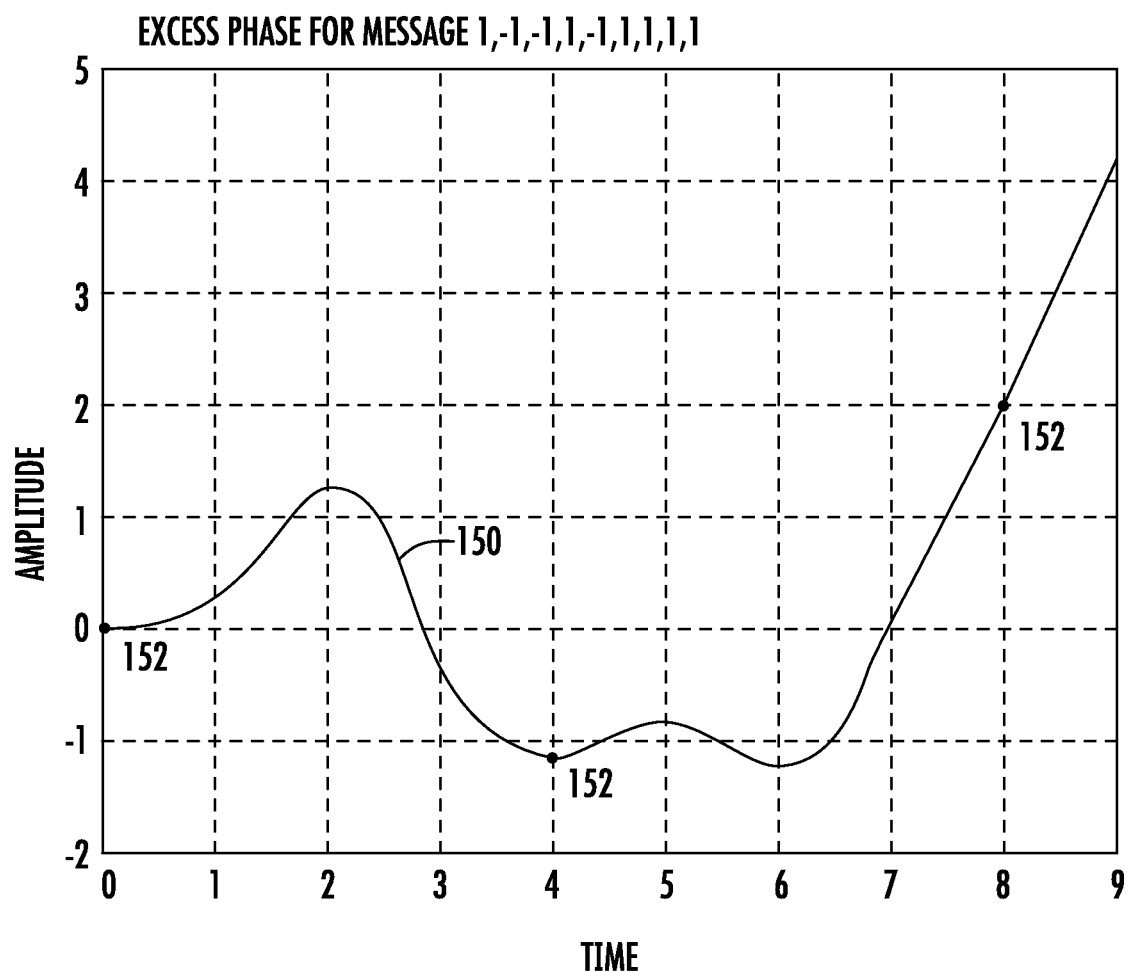
FIG. 6 is a graph representation of the excess phase for the message illustrated in FIG. 5.

From FIG. 6, the ISI is visible relative to FIG. 5. The aggregate excess phase 150 is shown in the accumulation of the phase pulses in FIG. 5. The value of the excess phase at each ADC sample in FIG. 5 is shown at points 152. The sample points 152 form a sufficient basis for reconstructing the constituent phase pulses, such as 130 and 132, in FIG. 6.

An additional benefit of CPM is that an unintended receiver configured to receive waveforms other than a CPM waveform cannot undo the ISI. However, the intended receiver will automatically undo the ISI given the Trellis-coded nature of the CPM. The Trellis-coding is not explicit in CPM, but is a useful artifact of the waveform design. The level of ISI may be further complicated for low-probability of intercept (LPI) by the values selected for h and BTP.

Thus, using CPM waveforms offer a unique LPI feature. This feature is obtained by a partial response signaling using low h and BTP. This approach to LPI does not require the bandwidth expansion of standard LPI techniques, such as chip rate dithering or fast frequency hopping, which are widely known in the art.

The spectrum of Gaussian partial response CPM for selected h and BTP combinations is provided in FIGS. 7, 8 and 9. For FIG. 7 the signal represented by line 160 corresponds to a BTP=1/10 and h=0.04, in FIG. 8 the signal represented by line 162 corresponds to a BTP=1/10 and h=0.125, and for FIG. 9 the signal represented by line 164 corresponds to a BTP=1/32 and h=0.125. As h and BTP are reduced, the spectral support of the partial response CPM waveform is greatly reduced.

Even for the conditions in FIG. 7, the signal could be Nyquist sampled with a small Mean-Square Error (MSE) at a rate of about 0.5 samples/symbol (−60 db aliasing products). For the conditions in FIG. 8, the sample rate could be reduced to about 0.4 samples/symbol and with the aliasing (−80 db level) being further reduced. Another example is shown in FIG. 9, where the sample rate may be about 0.2 samples/symbol for a −80 db aliasing. The main lobe spectral support may be further limited, as desired, by further reducing the h and BTP as is clearly evident from FIGS. 7, 8 and 9.

Figure 10:
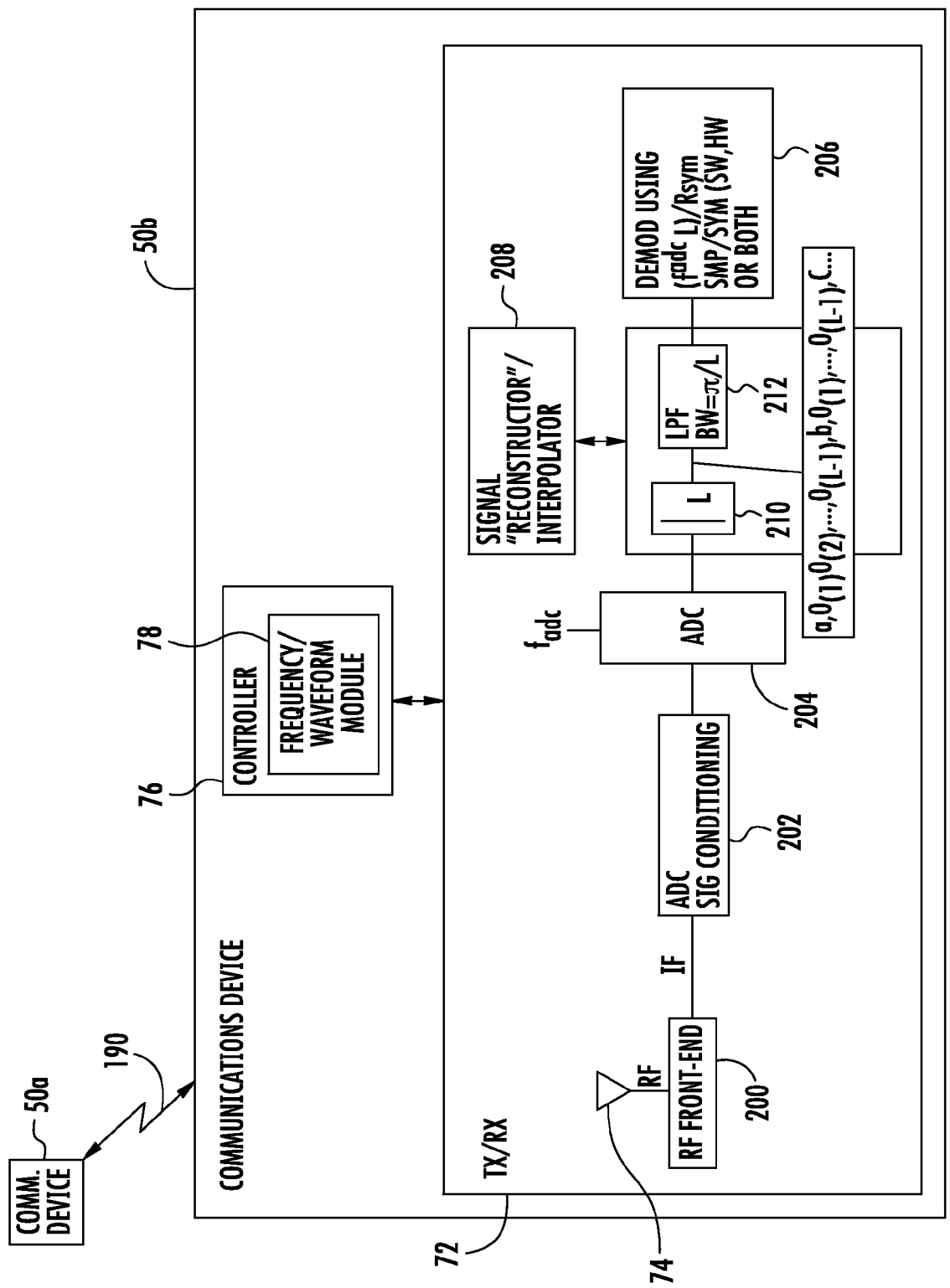
FIG. 10 is a more detailed block diagram of a wireless communications device in accordance with the present invention.

A more detailed block diagram of a wireless communications device is provided in FIG. 10. The waveform is transmitted from the first communications device 50(1) to the second communications device 50(2) over link 190. This link 190 and other links between the wireless communications devices are represented by dashed lines. The detailed block diagram is provided with respect to the receiver within the transceiver 72. The controller 76 with the frequency/waveform parameters module 78 selects the frequency and waveform parameters based on coordination with the first communications device 50(1) and the coordinator node 40.

The receiver portion within the transceiver 72 accepts the incoming signal and processes it using a suitable RF front-end 200 and ADC conditioning circuitry 202. These components are well known in the art and may include a variety of signal processing techniques. The ADC 204 operates at a sample frequency $f_{adc}$ less than the incoming symbol rate as discussed earlier. Such an approach offers the potential to make the ADC sample frequency much less than the symbol rate without resorting to higher-order modulation by appropriately choosing the phase pulse shape, modulation index, and bandwidth-time-product.

A constant envelope waveform is captured at the output of the ADC and the Nyquist sampling theorem is, to a good approximation, satisfied. Satisfying the Nyquist theorem is key to uniquely recovering the individual phase pulses, such as 130 and 134 of FIG. 5, so the underlying symbol data stream can be recovered.

Then, in order to achieve the desired number of samples-per-symbol for a particular demodulator 206, the information content in the acquired samples is up-sampled by an interpolator 208. The interpolation process is the standard digital scheme of inserting L−1 zeros into the data stream between data samples at block 210, and low pass filtering the result at filter 212. The exact choice of L and low pass filter characteristic depends upon the application. The result using a known "brick-wall" filter is shown for a particular embodiment. However, other filter types are not precluded and are readily foreseen as being compatible.

Due to the compact spectrum of the transmitted wave, the reconstruction error is made negligible. The output of the reconstructor/interpolator 208 is the same as if the demodulator 206 has been supplied data samples from a higher rate converter compatible with the demodulator sample rate requirement.

If a reverse link is available, such as the control links described above, the receiver can request that the transmitter select a particular partial response CPM waveform (i.e., the h and BTP) so that the receiver's ADC is sufficient to capture the information. This feature may be exploited in a point-point system and even a point-to-multipoint system, where the transmitter selects the waveform that satisfies each receiver's limitations.

The disclosed technique may be expanded to use other pulse shapes desired by the system designer, including numerically derived expressions that may be derived to optimize spectral efficiency for a given available power level. The illustrated embodiment has used a Gaussian pulse shape primarily for its smoothness in the time domain relative to other standard pulse shapes available analytically. However, the use of other pulse shapes is not precluded, and other suitable pulse shape could be selected as applications warrant. Examples of other possible partial response pulse shapes are presented in FIG. 11.

Figure 11:
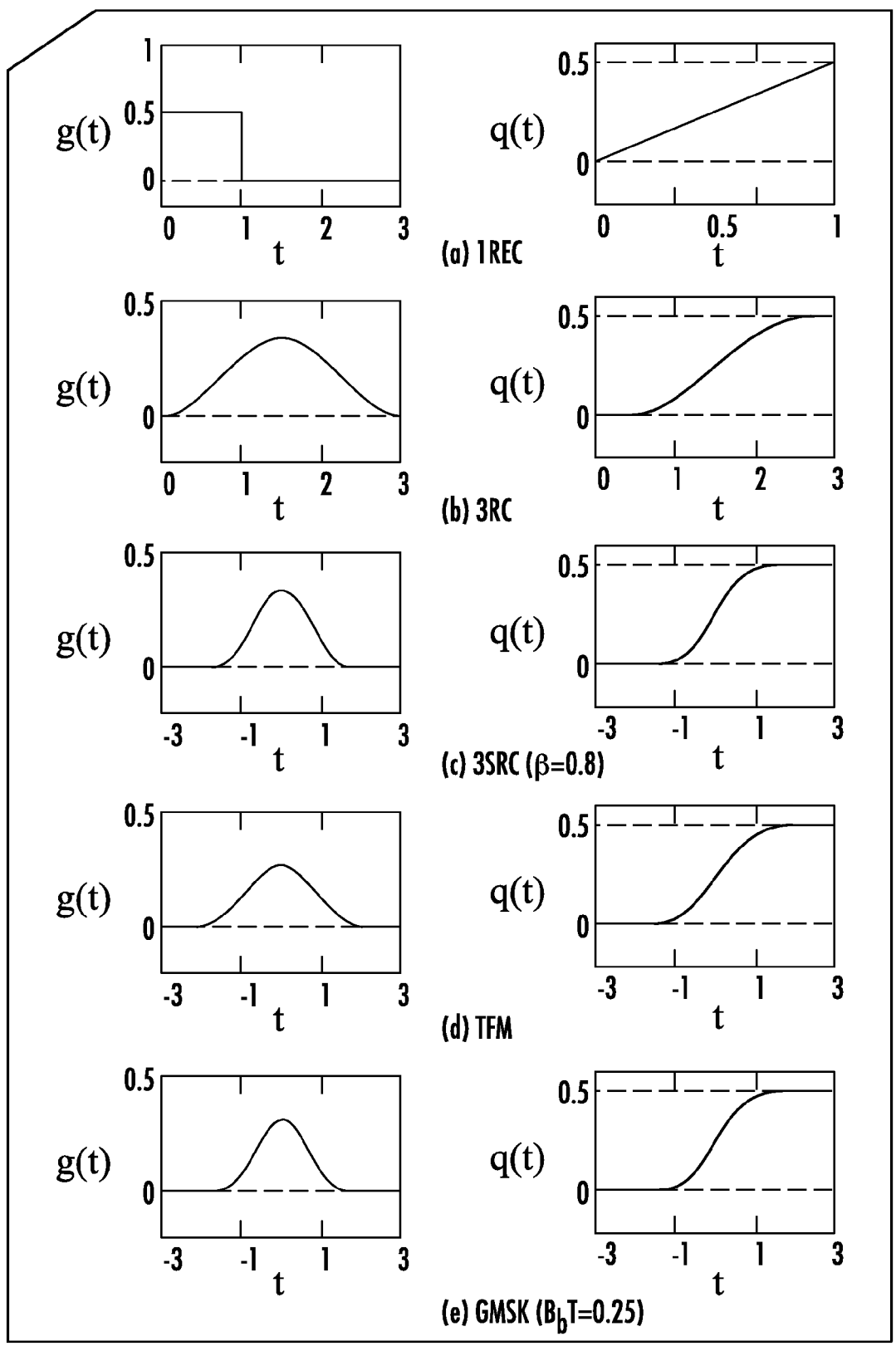
FIG. 11 provides graph representations of different pulse shapes g(t) and their respective phases q(t) in accordance with the present invention.

It is to be understood that the pulse shapes shown in FIG. 11 are exemplary only and are not limiting. The phase pulse shape is represented by q(t), and the spectral shape of the pulse width of the waveform is represented by q(t). These parameters along with the modulation index h are selected to control the expanse of the spectrum.

Still referring to FIG. 11, (a) corresponds to an L-symbol duration Rectangular Encoded (LREC) pulse shape, where L=1, (b) corresponds to an L-symbol duration Raised Cosine (LRC), where L=1, (c) corresponds to an L-symbol duration Spectral Raised Cosine (LSRC), where L=1, (d) corresponds to Tamed Frequency Modulation (TFM), and (e) corresponds to Gaussian Minimum Shift Keying (GMSK). The corresponding equations defining the just described waveforms are provided in FIG. 12.

Figure 13:
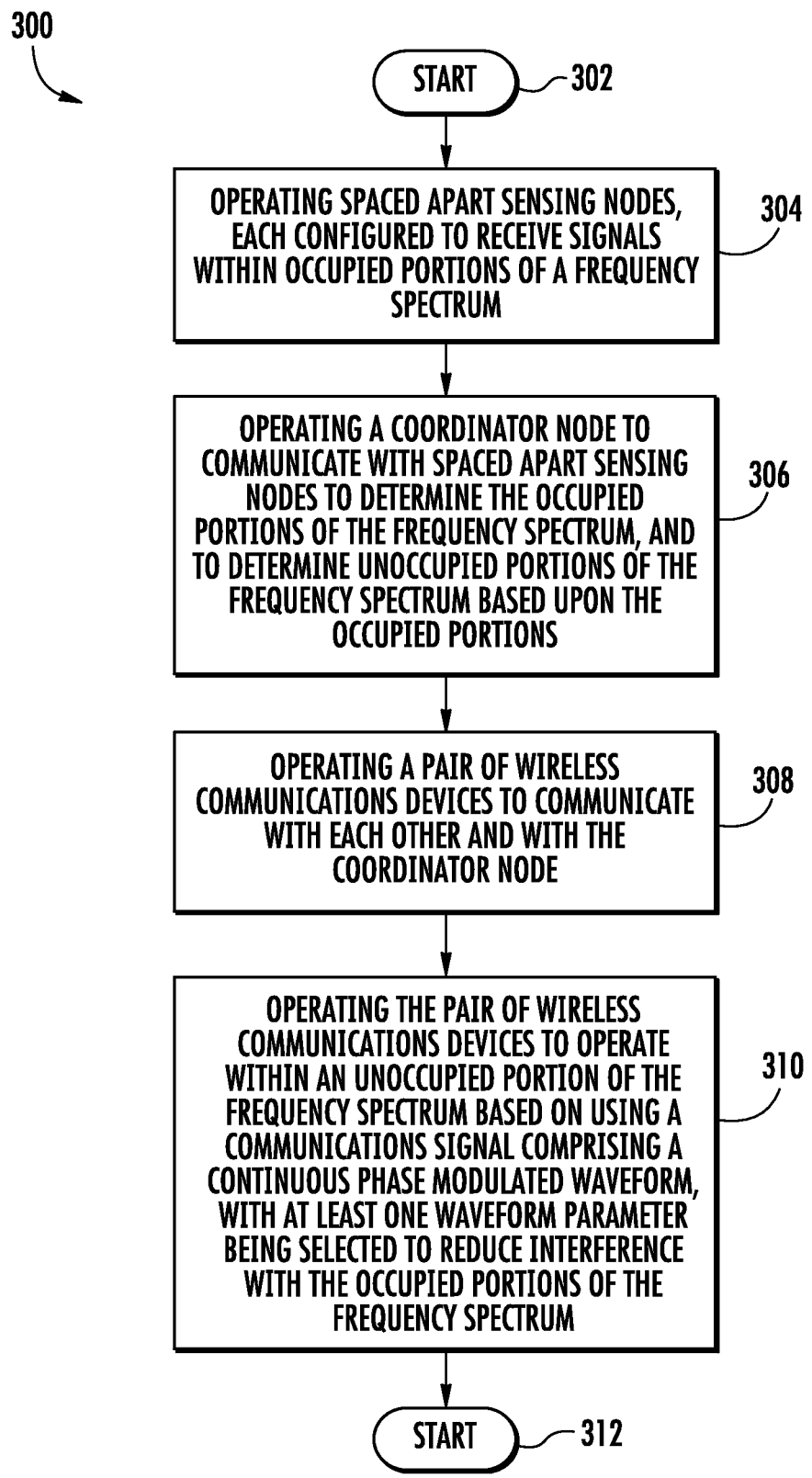
FIG. 13 is a flowchart illustrating a method for operating a communications system in accordance with the present disclosure.

A flowchart 300 illustrating a method for operating a communications system 20 as described above will now be discussed in reference to FIG. 13. From the start (Block 302), the method comprises operating a plurality of spaced apart sensing nodes 30 at Block 304, with each sensing node being configured to receive signals within occupied portions of a frequency spectrum.

A coordinator node 40 is operated at Block 306 to communicate with the plurality of spaced apart sensing nodes 30 to determine the occupied portions of the frequency spectrum, and to determine unoccupied portions of the frequency spectrum based upon the occupied portions. The method further comprises operating at least one pair of wireless communications devices 50(1)-50(2) at Block 310 to communicate with each other and with the coordinator node 40, and operate within an unoccupied portion of the frequency spectrum based on using a communications signal comprising a continuous phase modulated waveform. As discussed above, the at least one waveform parameter is selected to reduce interference with the occupied portions of the frequency spectrum. The method ends at Block 312.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A communications system comprising:
   a plurality of spaced apart sensing nodes each configured to receive signals within occupied portions of a frequency spectrum;
   a coordinator node configured to communicate with said plurality of spaced apart sensing nodes to determine the occupied portions of the frequency spectrum, and to determine unoccupied portions of the frequency spectrum based upon the occupied portions; and
   a pair of wireless communications devices configured to
      communicate with each other and with said coordinator node, and
      operate within an unoccupied portion of the frequency spectrum based on using a communications signal comprising a continuous phase modulated waveform, with at least one waveform parameter being selected to reduce interference with the occupied portions of the frequency spectrum.

2. The communications system according to claim 1 wherein the at least one waveform parameter comprises a modulation index.

3. The communications system according to claim 2 wherein said pair of wireless communications devices are operable to choose the modulation index based on a bandwidth of data to be transmitted therebetween.

4. The communications system according to claim 1 wherein the at least one waveform parameter comprises at least one of a pulse shape and a pulse duration.

5. The communications system according to claim 1 wherein said pair of wireless communications devices is configured to select the at least one waveform parameter.

6. The communications system according to claim 1 wherein each wireless communications device in said pair of wireless communications devices is configured to coordinate with the other via said coordinator node for the at least one selected waveform parameter.

7. The communications system according to claim 6 wherein coordination between said pair of wireless communications devices and said coordinator node is based on control signals comprising a waveform other than the continuous phase modulated waveform.

8. The communications system according to claim 1 wherein said pair of wireless communications devices is configured to communicate with said coordinator node to request available unoccupied portions of the frequency spectrum.

9. The communications system according to claim 8 wherein said coordinator node is configured to determine locations of said plurality of sensing nodes and said pair of wireless communications devices so that determination of the available unoccupied portions of the frequency spectrum is also based on the locations.

10. The communications system according to claim 8 wherein one of the available unoccupied portions of the frequency spectrum is selected by said pair of wireless communications devices.

11. The communications system according to claim 8 wherein one of the available unoccupied portions of the frequency spectrum is selected by said coordinator node.

12. The communications system according to claim 8 wherein communications between said pair of wireless communications devices and said coordinator node is based on control signals comprising a waveform other than the continuous phase modulated waveform.

13. The communications system according to claim 1 wherein each sensing node comprises a measurement module configured to measure the received signals, and to determine frequency allocations corresponding to the measured signals.

14. The communications system according to claim 1 wherein said coordinator node comprises:
a transceiver configured to receive from said plurality of sensing nodes frequency allocations corresponding to the occupied portions of the frequency spectrum; and
a controller coupled to said transceiver and configured to determine frequency allocations corresponding to the unoccupied portions of the frequency spectrum based on the frequency allocations corresponding to the occupied portions of the frequency spectrum;
said transceiver being further configured to transmit at least one of the determined frequency allocations to said pair of wireless communications devices.

15. A coordinator node for a communications system comprising a plurality of spaced apart sensing nodes each configured to receive signals within occupied portions of a frequency spectrum, and a pair of wireless communications devices configured to operate within an unoccupied portion of the frequency spectrum based on using a communications signal comprising a continuous phase modulated waveform, with at least one waveform parameter being selected to reduce interference with the occupied portions of the frequency spectrum, the coordinator node comprising:
a transceiver configured to receive from the plurality of sensing nodes frequency allocations corresponding to the occupied portions of the frequency spectrum; and
a controller coupled to said transceiver and configured to determine frequency allocations corresponding to the unoccupied portions of the frequency spectrum based on the frequency allocations corresponding to the occupied portions of the frequency spectrum;
said transceiver being further configured to transmit at least one of the determined frequency allocations to the pair of wireless communications devices.

16. The coordinator node according to claim 15 wherein said transceiver transmits the determined frequency allocations on a control link, and wherein each wireless communications device in the pair of wireless communications devices coordinates with the other via the control link for the at least one selected waveform parameter.

17. The coordinator node according to claim 16 wherein the at least one selected waveform parameter comprises a modulation index.

18. The coordinator node according to claim 16 wherein the at least one selected waveform parameter comprises at least one of a pulse shape and a pulse duration.

19. The coordinator node according to claim 16 wherein the control link comprises a waveform other than the continuous phase modulated waveform used between the pair of wireless communications devices.

20. The coordinator node according to claim 15 wherein said controller determines locations of the plurality of sensing nodes and the pair of wireless communications devices so that each determined frequency allocation for the occupied and unoccupied portions of the frequency spectrum is also based on the locations.

21. The coordinator node according to claim 20 wherein each determined frequency allocation has a center frequency and bandwidth associated therewith.

22. The coordinator node according to claim 15 wherein said controller is configured to select one of the unoccupied portions of the frequency spectrum for use by the pair of wireless communications devices.

23. The coordinator node according to claim 15 wherein each sensing node comprises a measurement module configured to measure the received signals, and to determine frequency allocations corresponding to the measured signals.

24. A method for operating a communications system comprising:
operating a plurality of spaced apart sensing nodes each configured to receive signals within occupied portions of a frequency spectrum;
operating a coordinator node to communicate with the plurality of spaced apart sensing nodes to determine the occupied portions of the frequency spectrum, and to determine unoccupied portions of the frequency spectrum based upon the occupied portions; and
operating a pair of wireless communications devices to communicate with each other and with the coordinator node, and
operate within an unoccupied portion of the frequency spectrum based on using a communications signal comprising a continuous phase modulated waveform, with at least one waveform parameter being selected to reduce interference with the occupied portions of the frequency spectrum.

25. The method according to claim 24 further comprising selecting the at least one waveform parameter to be a modulation index.

26. The method according to claim 25 further comprising choosing the modulation index based on a bandwidth of data to be transmitted between the pair of wireless communications devices.

27. The method according to claim 24 further comprising choosing the at least one waveform parameter to be at least one of a pulse shape and a pulse duration.

28. The method according to claim 27 further comprising the pair of wireless communications devices selecting the at least one waveform parameter.

29. The method according to claim 24 further comprising coordinating each wireless communications device in the pair of wireless communications devices coordinates with the other via the coordinator node for the at least one selected waveform parameter.

30. The method according to claim 29 further comprising coordinating between the pair of wireless communications devices and the coordinator node based on control signals comprising a waveform other than the continuous phase modulated waveform.

31. The method according to claim 24 further comprising configuring the pair of wireless communications devices to communicate with the coordinator node to request available unoccupied portions of the frequency spectrum.

32. The method according to claim 31 further comprising selecting one of the available unoccupied portions of the frequency spectrum by the pair of wireless communications devices.

33. The method according to claim 31 further comprising selecting one of the available unoccupied portions of the frequency spectrum by the coordinator node.

34. The method according to claim 31 further comprising coordinating between the pair of wireless communications devices and the coordinator node based on control signals comprising a waveform other than the continuous phase modulated waveform.

* * * * *